United States Patent
Lang et al.

[11] Patent Number: 5,950,774
[45] Date of Patent: Sep. 14, 1999

[54] LOAD LIMITER

[75] Inventors: David J. Lang, Rockford; Ted L. Jones, Cherry Valley, both of Ill.

[73] Assignee: Sundstrand Corporation, Rockford, Ill.

[21] Appl. No.: 08/942,585

[22] Filed: Oct. 2, 1997

[51] Int. Cl.⁶ ..................................................... B60T 7/12
[52] U.S. Cl. ...................... 188/134; 192/56.61; 192/150; 74/89.14; 188/79.55
[58] Field of Search ................................. 188/134, 79.55; 192/7, 56.61, 150; 74/89.14, 89.15, 424.8 R

[56] References Cited

U.S. PATENT DOCUMENTS

| | | | |
|---|---|---|---|
| 3,898,817 | 8/1975 | Capewell . | |
| 3,898,890 | 8/1975 | Simmons et al. . | |
| 4,318,304 | 3/1982 | Lang | 74/89.15 |
| 4,459,867 | 7/1984 | Jones | 192/150 |
| 4,697,672 | 10/1987 | Linton . | |
| 5,199,538 | 4/1993 | Fischer et al. | 188/134 |
| 5,299,666 | 4/1994 | Lang et al. . | |
| 5,630,490 | 5/1997 | Hudson et al. | 188/134 |
| 5,655,636 | 8/1997 | Lang et al. | 188/134 |

*Primary Examiner*—Robert J. Oberleitner
*Assistant Examiner*—Mariano Sy
*Attorney, Agent, or Firm*—Leydig, Voit & Mayer, Ltd.

[57] ABSTRACT

A load limiter for preventing stall torque from being transmitted from a power drive unit to the flight control surfaces of an aircraft. The present invention provides such a load limiter in a package having lower weight and smaller spacial requirements than has been heretofore possible. The power drive unit of the aircraft generates torque which is transmitted from a rotating input shaft to a worm gear, to a helical gear, to a ball screw, and to the flight control surface of the aircraft. If the flight control surface becomes jammed or otherwise prevented from movement, the ball screw, and consequently the helical gear, stop rotating. However, the stall torque of the power drive unit will continue to cause the input shaft to rotate, which will in turn cause the worm gear to rotate and interact with the helical gear. Since the helical gear cannot move, the helical gear will cause the worm gear to axially translate relative to the input shaft. The worm gear is normally prevented from such movement by compression and tension springs laterally flanking the worm gear, but by sizing the springs to be overcome by the level of the stall torque, one of the springs, depending on the direction of rotation of the input shaft, will compress to allow the worm gear to axially move and thus cause a toothed plated attached to the worm gear to engage a mating toothed plated fixed to the actuator housing. The engaged plates therefore ground the stall torque to the housing to prevent damage to the flight control surface and its transmission. The load limiter is disengaged by reversing the direction of rotation of the input shaft.

18 Claims, 3 Drawing Sheets

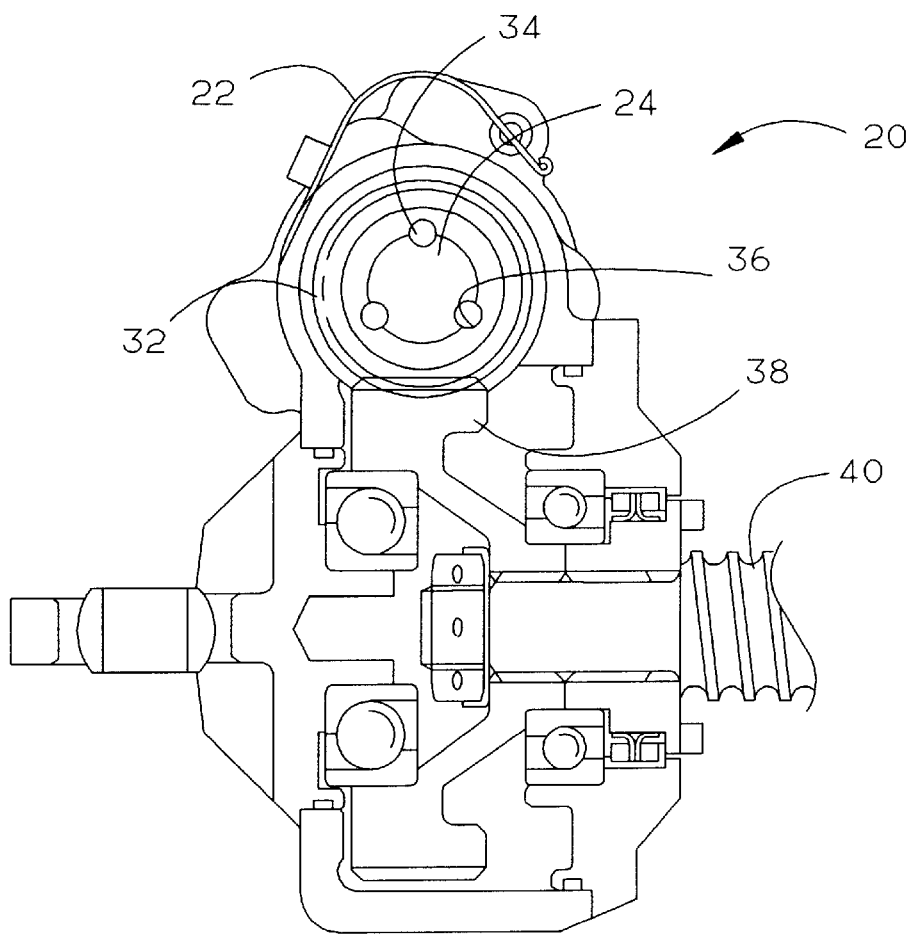
FIG.3
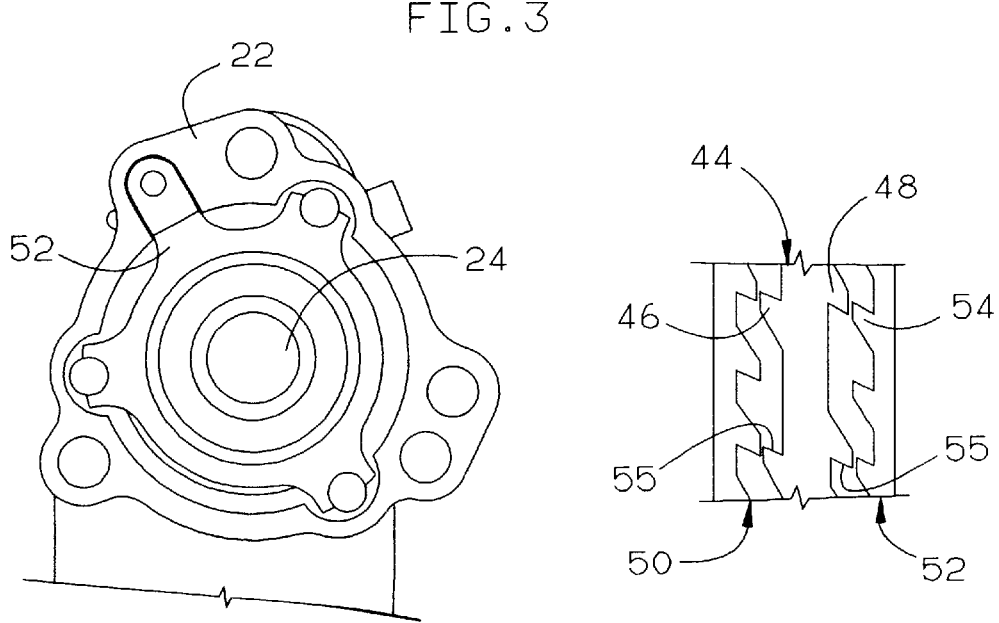
FIG.4
FIG.5

LOAD LIMITER

TECHNICAL FIELD

The present invention generally relates to load limiters, and more particularly relates to torque limiters used to prevent potentially damaging stall torque from a power drive unit from being transmitted to an aircraft control surface or an actuation system for an aircraft control surface.

BACKGROUND

In the operation of modern aircraft, flight control surfaces such as slats and flaps are powered by primary movers known as power drive units. The power drive units generate torque which is transmitted via a variety of transmission means to move the flight control surfaces in desired directions depending on the navigational and other demands placed on the aircraft. Given the importance of the flight control surfaces to the safety of the aircraft and its passengers, it is critical that the flight control surfaces be controlled by a reliable actuation system.

One problem associated with prior art systems is that if the drive line or transmission controlling the flight control surface becomes mechanically jammed, or if flight conditions prevent movement of the control surface in the desired direction, the power drive unit will not stop generating torque. Rather, the power drive unit, which is normally hydraulically powered, will generate relatively high stall torque. This stall torque will be transmitted to the input shaft and gearing of the flight control surface actuator, and is often sufficiently high to detrimentally affect and potentially catastrophically damage the flight control surface or the flight control surface actuator.

Various attempts have therefore been made to devise a system to prevent such stall torque from being transmitted to the flight control surfaces in the event of such a mechanical jam or other interference. For example, U.S. Pat. No. 4,030,578, issued to Cacciola et al., discloses a brake disc pack which rotates with the actuator shaft and is compressed against a non-rotatable object as, for example, part of a housing when it is desired to stop rotation of the actuator shaft. The compression is against the bias of a spring and the excess torque is absorbed in the brake disc pack and grounded to the housing. One undesirable feature of such a system is that the predominantly controlling feature with respect to the amount of torque capable of being absorbed is the coefficient of friction exhibited by the brake disc pack. Therefore, in order to ensure the brake disc pack is sufficiently powerful to stop rotation of the actuator shaft, the actual brake discs are often oversized. This necessarily imposes substantial weight and space penalties on the aircraft. As modern aircraft are continually being redesigned and fine-tuned to reduce both the weight and volume of the onboard equipment, such brake disc packs are becoming increasing undesirable. It would therefore be desirable to eliminate such brake disc packs and optimize the weight and volume requirements even further, and therefore result in a more efficient aircraft.

A more recent attempt at such a reduction is disclosed in U.S. Pat. No. 5,299,666, issued to Lang et al., and assigned to the present assignee. As disclosed therein the brake disc pack is eliminated by employing a pair of toothed plates wherein one plate is splined to the actuation shaft for rotation therewith, and the other is fixedly attached to the actuator housing. When it is desired to stop rotation of the input shaft, the plate splined to the actuation shaft is moved into engagement with the plate attached to the housing. By employing toothed plates, the dependence on the coefficient of friction of the brake discs, as well as the weight and space penalties associated therewith, are avoided. In addition, the Cacciola et al. patented device employs a ball ramp coupling to transmit torque. With such ball ramp couplings, the balls need to be constructed of sufficient size so as to be capable of transmitting torque levels up to the level of stall torque. Such size requirements necessary impose negative weight and space penalties similar to those identified above which cannot be tolerated in modern, efficiency-conscious aircraft.

SUMMARY

It is therefore the primary aim of the present invention to provide a new and improved load limiter to prevent stall torque from being transmitted from a primary mover to the flight control surfaces and flight control surface actuators of an aircraft.

It is an objective of the present invention to provide a load limiter having a lower weight than prior art load limiters.

It is another objective of the present invention to provide a load limiter with smaller space requirements than prior art load limiters.

It is another objective of the present invention to provide a load limiter which avoids the use of brake disc packs to stop rotation, and thereby avoids the weight and space penalties associated therewith.

It is still another objective of the present invention to provide a load limiter which avoids the use of ball ramp couplers to join the input shaft to the load limiter, and thereby avoids the weight and space penalties associated therewith.

It is still another objective of the present invention to provide a load limiter which is easily resettable for subsequent uses.

It is yet another objective of the present invention to provide a load limiter which is adapted to work with a bidirectional input.

It is yet another objective of the present invention to provide a load limiter which is adapted to work with a bidirectional input and which is able to act with varying torque limiting levels depending on the direction of rotation of the input.

In accordance with these aims and objectives, it is a feature of the present invention to provide a load limiter which employs a worm gear splined to an input shaft. The worm gear is thereby adapted to rotate concurrent with the input shaft, as well as axially translate relative to the input shaft. The worm gear normally is held against axial translation by compression and tension springs laterally flanking the worm gear, and normally transmits torque from the input shaft to a helical gear and in turn to a ball screw attached to an aircraft flight control surface. However, when the aircraft flight control surface becomes jammed or otherwise prevented from movement, and the ball screw and helical gear consequently are prevented from movement as well, the stall torque of the primary mover, and the subsequent rotation of the input shaft, causes the worm gear to rotate against the fixed helical gear and axially translate along the input shaft. A toothed plate attached to the worm gear therefore axially moves with the worm gear and is thereby caused to engage a mating toothed plate fixedly attached to the actuator housing. Since the fixed plate is attached to the housing, the stall torque of the primary drive unit is grounded to the housing and thus prevented from causing potential damage to the aircraft flight control surface or actuator.

It is another feature of the present invention to provide first and second toothed plates on first and second ends of the worm gear and first and second opposed and mating toothed plates on the actuator housing and flanking the worm gear to prevent rotation of the input shaft depending on its direction of rotation.

It is still another feature of the present invention to provide the first and second toothed plates on the worm gear and the first and second toothed plates on the actuator housing with negative rake angle teeth to thereby provide a positive means of rotation prevention, and thereby provide a simple mechanism by which the teeth can be disengaged upon a reversal in the direction of rotation of the input shaft.

It is still another feature of the present invention to couple the worm gear to the input shaft using a series of ball splines which allow torque from the input shaft to cause the worm gear to rotate, and which allow the worm gear to axially translate along the input shaft when the worm gear cannot cause a helical gear coupled to the worm gear to rotate therewith.

It is yet another feature of the present invention to size the compression and tension springs to hold the worm gear against axial movement except when the actuator is jammed or otherwise prevented from movement, and stall torque is therefore transmitted through the actuator. In the preferred embodiment, the compression spring is stronger than the tension spring, but is to be understood that the present invention allows the springs to be sized and altered in accordance with a wide range of applications.

These and other aims, objectives and features of the present invention will become apparent to those of ordinary skill in the art from the following specification when read and appreciated in conjunction with the accompanying drawings.

BRIEF DESCRIPTION OF THE DRAWINGS

FIG. 3 is a sectional view of the embodiment shown in FIG. 1 taken along line 3—3;

FIG. 4 is a sectional view taken along line 4—4 of FIG. 2; and

FIG. 5 is an enlarged, fragmentary view of the jaw teeth of both the stationary plates and the rotating plate of the preferred embodiment.

Although certain embodiments and illustrative features of the present invention will be described in the following detailed description, it is to be understood that such embodiments and features are disclosed for the express purpose of providing the best mode and preferred embodiment of present invention and should in no way serve as a limitation thereof. Rather, it is the intention of the present invention to be employed in embodiments and applications in addition to those specifically disclosed herein, and to cover all embodiments reasonably conveyed by the following description and covered by the appended claims.

DETAILED DESCRIPTION OF PREFERRED EMBODIMENTS

Figure 1:
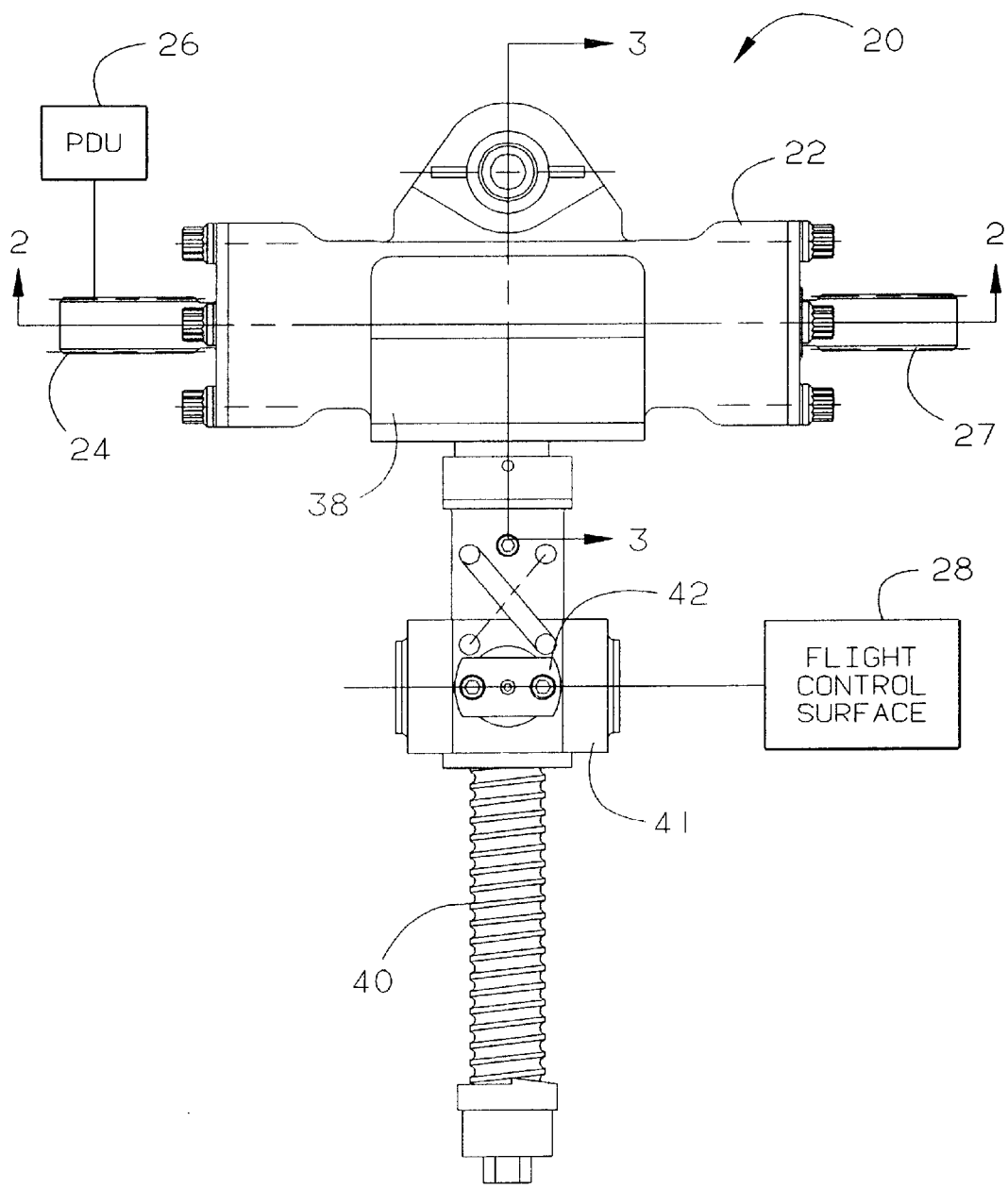
FIG. 1 is plan view of the preferred embodiment of the load limiter made in accordance with the present invention.

Referring now to the drawings, and with specific reference to FIG. 1, a load limiter built in accordance with the present invention is shown and generally designated by reference numeral 20. As shown therein, load limiter 20 includes a housing 22 in which input shaft 24 is journalled for rotation. Input shaft 24 rotates as a result of torque generated by and received from a primary mover 26. As shown, input shaft 24 includes a plurality of splines 27 which are adapted to mechanically couple primary mover 26 to input shaft 24. In the most typical application, the primary mover will be a power drive unit (hereinafter referred to as "PDU") and load limiter 20 will be used to prevent stall torque from the PDU from being transmitted to a flight control surface 28. As indicated above, if a load limiter is not provided the flight control surface or any of the components of its actuator transmission can be seriously damaged when a mechanical jam occurs or the flight control surface is otherwise prevented from rotation.

Figure 2:
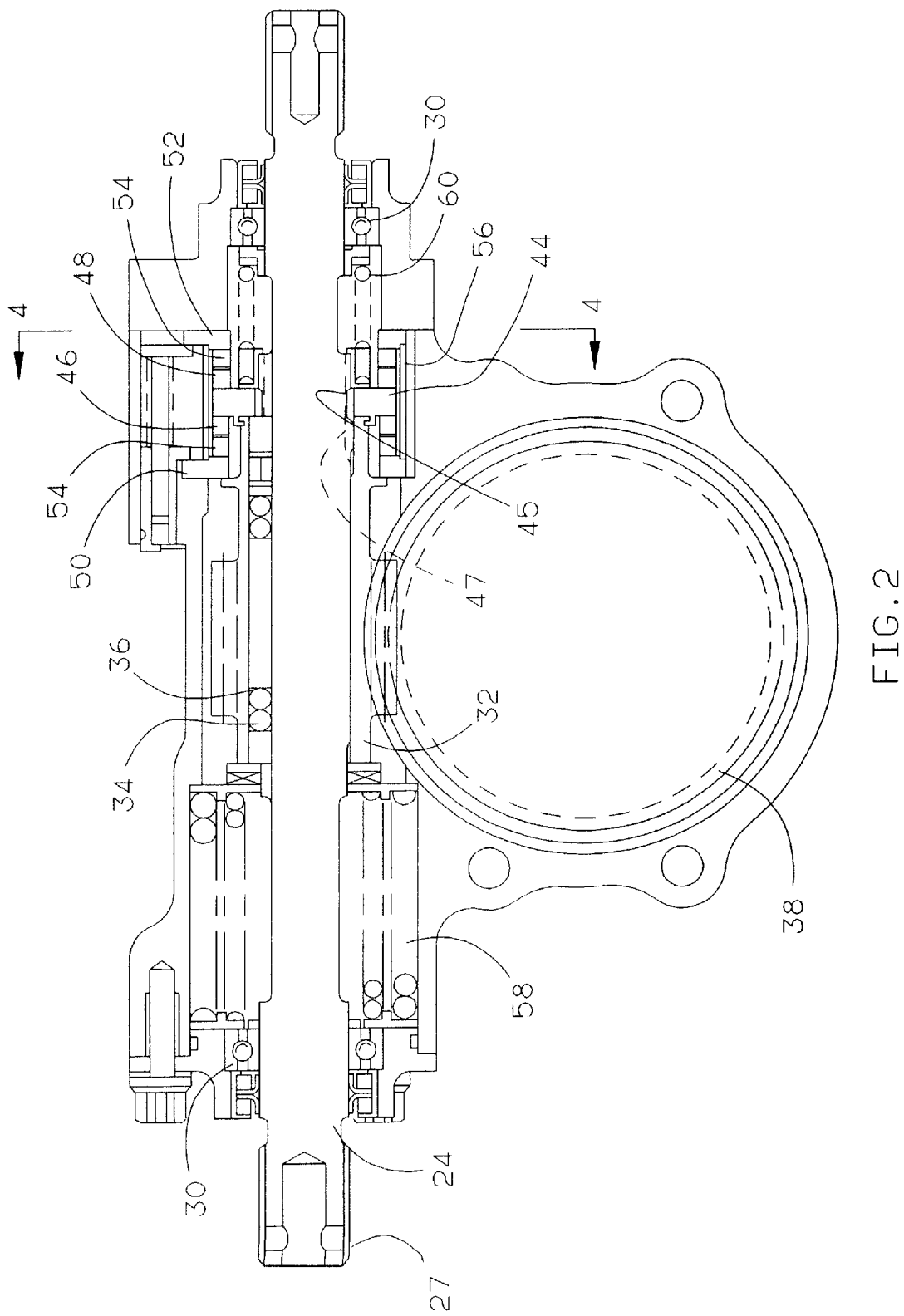
FIG. 2 is a sectional view of the embodiment shown in FIG. 1 taken along line 2—2.

In order to actually control the movement of the flight control surface, PDU 26 causes input shaft 24 to rotate. As shown in FIG. 2, shaft 24 is mounted for rotation within bearings 30. Worm gear 32 is then provided about input shaft 24 and provided with ball splines 34 which engage grooves 36 provided in input shaft 24. Therefore, rotation of input shaft 24 causes concurrent rotation of worm gear 32. Splines 34 and grooves 36 also allow for axial translation of worm gear 32 relative to input shaft 24, the importance of which will be discussed with further detail herein. In the preferred embodiment four (4) sets of three (3) ball splines 34 as shown in FIGS. 2–4 are provided, but it is to be understood that in alternative embodiments, a different number of ball splines 34, or even alternative types of splines or couplings can be employed to allow for concurrent rotation and axial translation of worm gear 32.

To complete the transmission, rotating worm gear 32 engages helical gear 38 to cause rotation of helical gear 38. As shown in FIGS. 1 and 3, helical gear 38 is coupled to ball screw 40 (see FIG. 1) such that rotation of helical gear 38 causes corresponding rotation of ball screw 40 and thus axial translation of ball screw nut 41 along ball screw 40. The actual flight control surface 28, such as a flap or slat, is then connected to ball screw nut 41 such that flight control surface 28 moves in accordance with the movements of ball screw 40. Although not directed to the present invention, for the sake of clarity and completeness, it is important to note that ball screw nut 41 will conventionally be equipped with mounting apparatus 42 enabling flight control surface 28 to pivot and move appropriately.

Under normal operating conditions, the pilot of the aircraft will operate PDU 26 to move flight control surface 28 depending on the navigational and speed demands of the flight, and will do so without interruption. However, if a mechanical jam should occur, for example, should an actuator component break, or should aircraft maintenance personnel inadvertently leave tooling within the aircraft, or should an external force such as the passing airstream be sufficiently powerful to prevent such movement, the system needs to be able to prevent the stall torque of the PDU from being transmitted to, and damaging, the components of the flight control surface actuation system.

Therefore, in accordance with one of the inventive features of the present invention, worm gear 32 includes toothed plate 44 having first and second toothed sides 46 and 48, as best shown in FIG. 2. In the preferred embodiment, toothed plate 44 includes splines 45 which mate with grooves 47 provided in input shaft 24 such that toothed plate 44 rotates and axially moves with worm gear 32. Furthermore, housing 22 includes first and second toothed plates 50, 52 which laterally flank worm gear toothed plate 44. Plates 50 and 52 are disposed such that teeth 54 oppose, in mating orientation, sides 46 and 48 of toothed plate 44. A coil spring 56 is interposed between plate 50 and 52 to normally bias plates 50 and 52 out of engagement with worm gear toothed plate 44.

As stated above, worm gear 32 normally rotates with input shaft 24 to cause corresponding rotation of helical gear 38 and ball screw 40. During such normal operation compression spring 58 and tension spring 60 bias worm gear 32 toward a central position wherein toothed plate 44 is out of engagement with toothed plates 50 and 52. However, when flight control surface 28 is prevented from movement, the stall torque of PDU 26 will continue to rotate input shaft 24 which in turn will transmit torque to worm gear 32. Since helical gear 38 is unable to move, the stall torque will cause worm gear 32 to rotate against fixed helical gear 38 and therefore axially translate along input shaft 24 against the biasing force of either compression spring 58 or tension spring 60, depending on the direction of rotation of input shaft 24. Worm gear 32 and toothed plate 44 will continue to axially translate until toothed plate 44 engages one of toothed plates 50 and 52.

It can therefore be seen that by appropriately sizing compression spring 58 and tension spring 60 to correspond to less than the stall torque of PDU 26, worm gear 32 will be able to overcome the biasing force of either spring 58 or 60 and axially move until toothed plate 44 engages either toothed plate 50 or 52. One of ordinary skill in the art will therefore readily appreciate that once the toothed plated engage each other, input shaft 24 will stop rotating, and damage to the system will be averted in that the stall torque will be grounded to housing 22. It will also be appreciated that the system can be adjusted to have different trip settings in different directions depending on the size of compression spring 58 and tension spring 60. In the preferred embodiment, compression spring 58 is sized to have a trip setting substantially greater than tension spring 60, but it is to be understood that a wide range of compression and tension springs sizes can be employed depending on the given application.

Referring now with specific reference to FIG. 5, it can be seen that toothed plates 44, 50, and 52 include teeth 54 having negative rake angles. As opposed to prior art devices which employed brake discs whose efficacy was necessarily dependent on the coefficient of friction of the brake discs, the negative rake angle teeth 54 of the present invention provide a substantially improved means of positive engagement with greatly improved load limiting potential. In other words, upon teeth 46 or 48 of plate 44 engaging the tips of teeth 54 of plate 50 or 52, the angled side surfaces 55 of teeth 46 or 48 will direct the rotational force of plate 44 to pull plate 50 or 52 toward plate 44, and draw the plates together.

In order to reset load limiter 20, the operator need only reverse the direction of rotation of input shaft 24. In actual practice, this means the pilot of the aircraft will cause PDU 26 to reverse direction, which in turn will cause input shaft 24 and worm gear 32 to reverse direction. The reverse direction of the resulting torque will cause the biasing force of either the compression spring 58 or the tension spring 60 to axially move worm gear 32 back to a normal, central position, and thus cause toothed plate 44 to move out of engagement with toothed plates 50 and 52. The torque can then be transmitted from worm gear 32 to helical gear 38 and thus to ball screw 40 and flight control surface 28 as indicated before.

From the foregoing, it can be appreciated that the present invention brings to the art a new and improved load limiter most preferably employed to prevent stall torque from being transmitted from a power drive unit to an aircraft flight control surface. By employing a novel worm and helical gear transmission with opposing compression and tension springs, the present invention is able to limit such stall torque transmission in a smaller, and lighter package than has heretofore been possible. Moreover, by employing opposing springs the present invention is able to adjust the maximum torque levels in both rotational directions. Furthermore, by using negative rake angle teeth, limiting potential and reliability are enhanced.

It should be understood that as used herein the term "compression spring" is used to refer to a spring that sets the trip setting for actuation forces that place the actuator 20 in compression, while the term "tension spring" is used to refer to the spring which sets the trip setting for actuation loads that place the actuator 20 in tension.

What is claimed is:

1. A load limiter, comprising:

a housing having a toothed plate fixedly attached thereto;

an actuator shaft mounted for rotation within the housing and adapted to receive torque from a power drive unit;

a worm gear splined to the actuator shaft and adapted to rotate with the actuator shaft, the worm gear further adapted to axially translate relative to the actuator shaft, the worm gear including a toothed plate adapted to rotate with the worm gear and opposing the housing toothed plate;

a helical gear engaging the worm gear and being rotated thereby;

a ball screw coupled to the helical gear for rotation therewith, the ball screw adapted to be attached to a movable element; and first and second springs laterally flanking the worm gear to prevent axial translation of the worm gear relative to the actuator shaft when the power drive unit generates less than stall torque, one of the first and second springs adapted to compress when the power drive unit generates stall torque to thereby allow the worm gear to axially translate relative to the actuator shaft and cause the worm gear toothed plate to engage the housing toothed plate to prevent further rotation of the actuator shaft.

2. The load limiter of claim 1 wherein the housing includes first and second toothed plates, the first and second housing toothed plates including opposed teeth and being separated by a coil spring, and wherein the worm gear toothed plate includes first and second sides with teeth being provided on both the first and second sides to engage either the first or second housing toothed plate.

3. The load limiter of claim 2 wherein the first and second housing toothed plates and the worm gear toothed plate include teeth having negative rake angles.

4. The load limiter of claim 1 wherein the worm gear is splined to the actuator shaft using ball splines.

5. A flight control surface actuation system, comprising;

a flight control surface;

a primary mover adapted to generate torque for movement of the flight control surface;

transmission means for communication of the torque generated by the primary mover to the flight control surface; and a load limiter connected to the transmission means for preventing stall torque of the primary mover from being transmitted to the flight control surface in the event the flight control surface is unable to move to thereby prevent damage to the primary mover, transmission means, and flight control surface, the load limiter means including a worm gear connected for rotation with and axial translation along an input shaft connected to the primary mover, a helical gear connected to the worm gear, a ball screw coupled to the helical gear and the flight control surface, a toothed plate connected to the worm gear and interposed between first and second toothed plates attached to a housing within which the input shaft rotates, and springs laterally flanking the worm gear and biasing the worm gear toothed plate out of engagement with the housing toothed plates;

whereby failure of the flight control surface to move causes the primary mover to generate stall torque which in turn causes the worm gear to axially move and overcome the biasing force of one of the compression and tension springs and thereby cause the worm gear toothed plate to engage one of the first and second housing toothed plates to ground the stall torque to the housing.

6. The flight control surface actuation system of claim 5 wherein the first and second toothed plates attached to the housing are axially separated by a coil spring, the coil spring adapted to compress when the toothed plate connected to the worm gear engages one of the housing toothed plates.

7. The flight control surface actuation system of claim 6 wherein the first and second toothed plates attached to the housing include teeth having negative rake angles.

8. A The flight control surface actuation system of claim 5 wherein the worm gear is connected for rotation with, and axial translation along, the input shaft by a plurality of ball splines.

9. The flight control surface actuation system of claim 5 wherein the worm gear toothed plate connected to the input shaft is connected thereto using mechanical splines.

10. A torque limiter of the type used to prevent stall torque from a power drive unit from being transmitted to a flight control surface or a flight control surface actuation mechanism in the event the flight control surface is unable to move against a passing airstream, or the flight control surface actuation mechanism is mechanically jammed, the torque limiter comprising:

an input shaft connected to the power drive unit and adapted to rotate and transmit torque generated by the power drive unit, the input shaft mounted for rotation in a housing;

first gear means connected to the input shaft and adapted to rotate with the input shaft and axially translate along the input shaft, the first gear means being held against axial translation along the input shaft by biasing means;

second gear means connected to the first gear means and adapted to be driven by with the first gear means and transmit the torque generated by the power drive unit, the flight control surface being connected to the second gear means and adapted to move as the input shaft rotates;

a first toothed plate attached to the first gear means and adapted to rotate with and axially move with the first gear means; and a second toothed plate attached to the housing, the second toothed plate including teeth positioned in mating opposition to teeth provided on the first toothed plate, the first gear means adapted to overcome the biasing means and axially translate along the input shaft in the event that the flight control surface is unable to move and the primary drive unit is generating stall torque, the teeth of the first toothed plate adapted to engage the teeth of the second toothed plate to stop rotation of the input shaft in the event that the first gear means axially translates along the input shaft.

11. The torque limiter of claim 10 wherein the first gear means is a worm gear splined to the input shaft.

12. The torque limiter of claim 11 wherein the worm gear is splined to the input shaft using ball splines.

13. The torque limiter of claim 10 wherein the biasing means include springs interposed between the first gear means and the housing.

14. The torque limiter of claim 13 wherein the one spring is sized to have a greater trip setting than the other spring.

15. The torque limiter of claim 11 wherein the second gear means includes a helical gear mechanically coupled to the worm gear, and a ball screw nut mechanically coupled to the worm gear, the flight control surface being coupled to the ball screw nut, the ball screw nut adapted to axially translate along a ball screw when the helical gear causes the ball screw nut to rotate.

16. The torque limiter of claim 10 wherein the first toothed plate is splined to the input shaft.

17. The torque limiter of claim 10 further including a third toothed plate attached to the housing and positioned in mating opposition to the first toothed plate, the first toothed plate adapted to engage the second toothed plate when the primary drive unit is generating stall torque and the input shaft is rotating in one of a clockwise and counterclockwise direction, the first toothed plate adapted to engage the third toothed plate when the primary drive unit is generating stall torque and the input shaft is rotating in the other of a clockwise and counterclockwise direction, the second and third toothed plates being biased apart by a coil spring, the coil spring being compressed with the first toothed plate engages one of the second and third toothed plates.

18. The torque limiter of claim 17 wherein the first, second, and third toothed plates each include a plurality of teeth having negative rake angles.

* * * * *